(12) United States Patent
Ishii et al.

(10) Patent No.: US 7,248,330 B2
(45) Date of Patent: Jul. 24, 2007

(54) LIQUID CRYSTAL DISPLAY DEVICE AND MANUFACTURING METHOD THEREOF

(75) Inventors: Akira Ishii, Mobara (JP); Yoshitaka Imabayashi, Mobara (JP)

(73) Assignee: Hitachi Displays, Ltd., Mobara-Shi (JP)

( * ) Notice: Subject to any disclaimer, the term of this patent is extended or adjusted under 35 U.S.C. 154(b) by 0 days.

(21) Appl. No.: 10/890,250

(22) Filed: Jul. 14, 2004

(65) Prior Publication Data

US 2005/0012889 A1    Jan. 20, 2005

(30) Foreign Application Priority Data

Jul. 14, 2003   (JP)   .............................. 2003-196409

(51) Int. Cl.
  *G02F 1/1339*   (2006.01)
(52) U.S. Cl. ...................................... 349/156
(58) Field of Classification Search ................. 349/156
  See application file for complete search history.

(56) References Cited

U.S. PATENT DOCUMENTS 6,411,360 B1 * 6/2002 Matsuyama et al. ........ 349/156

2004/0233378 A1* 11/2004 Okamoto et al. ........... 349/156

FOREIGN PATENT DOCUMENTS

JP    2002-229040    8/2002

* cited by examiner

*Primary Examiner*—James A. Dudek
(74) *Attorney, Agent, or Firm*—Antonelli, Terry, Stout & Kraus, LLP.

(57) ABSTRACT

In a liquid crystal display device having a pair of substrates that are opposite to and bonded to each other, a liquid crystal layer is sealed between the pair of substrates, and columnar spacers are formed on one of the pair of substrates and in contact with the other substrate to maintain a gap between the pair of substrates. The surfaces of support columns of the columnar spacers are made to be rough to enhance the friction force between the pair of substrates and to prevent the other of the pair of substrates from diverging from the one of the pair of substrates, so that display quality of the liquid crystal display device is improved.

19 Claims, 5 Drawing Sheets

LIQUID CRYSTAL DISPLAY DEVICE AND MANUFACTURING METHOD THEREOF

The present application claims priority from Japanese application JP 2003-196409 filed on Jul. 14, 2003, the content of which is hereby incorporated by reference into this application.

BACKGROUND OF THE INVENTION

The present invention relates to a liquid crystal display device and to a method of manufacture thereof; and, more particularly, the invention relates to a liquid crystal display device which includes spacers for holding a fixed gap between a pair of substrates, which seal a liquid crystal layer therebetween, the spacers being constructed to decrease display irregularities, thus enabling an image display of high quality, and to a method of manufacture thereof.

As an example of display devices which are capable of producing a color display of high definition for notebook type computers and computer monitors, liquid crystal display devices have been popularly adopted. This type of liquid crystal display device is basically configured such that a liquid crystal layer is sandwiched in a gap defined between opposing faces of a pair of substrates, at least one of which is formed of a light transmitting glass plate or the like.

The liquid crystal display device is roughly classified into a type (a single matrix type liquid crystal display device) which turns on and off given pixels by selectively applying voltages to various electrodes defining pixels formed on a pair of substrates and a type (an active matrix type liquid crystal display device) which turns on and off given pixels by controlling various electrodes and pixel selecting switching elements which are formed on either one or both of the substrates.

The representative structure of the active matrix type liquid crystal display device lies in the fact that thin film diodes (TFD) or thin film transistors (TFT) are adopted as the switching elements formed on one of the substrates. Particularly, the liquid crystal display device which uses thin film transistors is thin and light-weight, and it can obtain a high quality compatible to the quality of a cathode ray tube, and, hence, the liquid crystal display device has been popularly used in display terminal monitors of various OA equipment.

The display method employed by the active matrix type liquid crystal display device is roughly classified into two types based on the difference in the driving method to be used. One display method is a method (a so-called vertical electric field method or a TN method) in which a liquid crystal layer is sandwiched between two substrates on which transparent electrodes are respectively formed, liquid crystal is operated by voltages which are applied to the transparent electrodes, thus modulating light which passes through the transparent electrodes and is incident on the liquid crystal layer so as to provide a display. Most products which are now popularly used adopt this method.

Another method is a method (a so-called lateral electric field method or an IPS method) in which liquid crystal is operated by an electric field which is formed between two electrodes formed on the same substrate and which is substantially parallel to a surface of the substrate, thus modulating light which is incident on the liquid crystal layer through a gap defined between the two electrodes, so as to provide a display.

In both types of liquid crystal display devices, it is necessary to maintain a gap between the pair of substrates which sandwich the liquid crystal layer, that is, a cell gap, at a given value. As means to hold the gap at the given value, minute beads (bead spacers) made of glass or resin have been popularly used conventionally. Since the bead spacers are scattered on a surface of one substrate by spraying or the like before the respective substrates are bonded to each other, the beads are distributed also in the pixel regions. Accordingly, transmitting light or reflection light passes through the bead spacers, and, hence, there has been a drawback that so-called leaking of light is generated, thus lowering the contrast.

Further, these liquid crystal display devices are manufactured in such a state that a large number of glass spacers are scattered on a surface of the substrate, and the spacers which are present in the pixel region become a cause of lowering of the image quality due to a defective orientation of the liquid crystal layer. Further, a coagulated spacer block or a non-uniformity of the scattering density becomes a cause of inducing a defective gap.

To overcome the drawbacks relating to the presence of the bead spacers, a structure has been proposed which fixedly forms columnar members between the pair of substrates as spacers. These spacers are referred to as columnar spacers (SOC) and are usually formed by applying a photosensitive region to the substrate and exposing, developing and baking the photosensitive resin by way of a mask on which a pattern for forming the columnar spacers is depicted. Particularly, the columnar spacers are arranged so as to avoid pixel electrodes, such as crossing portions between gate lines and drain lines, which are formed on substrates which face each other in an opposed manner.

With respect to the columnar spacers which are formed in this manner, although the gap between the opposing substrates is maintained, it is desirable that the columnar spacers have a fixed shape to hold the gap at a fixed value. Further, to support pressure which is applied to the columnar spacers at the time of manufacture or in the use of the liquid crystal display device, it is desirable that the diameter of the contact portions between the columnar spacers and the substrate is large.

In the above-mentioned step of baking the photosensitive resin, when the columnar spacers melt, irregularities arise with respect to the shape of the columnar spacers after the baking due to the irregularities in the shape and material of the spacers before baking, and the baking conditions. Particularly, with respect to the shape of the vicinity of a peak of the columnar spacer which is formed using a photo mask, a peak portion, that is, a surface which is brought into contact with the counter substrate, is rounded, and, hence, a portion where the columnar spacer and the substrate come into contact with each other becomes small, whereby irregularities in the cell thickness are liable to occur.

Further, the columnar spacer having such a round peak portion receives weight at one point compared with a columnar spacer having a flat peak portion, and, hence, there exists a possibility that the columnar spacer generates a deformation, such as warping, in the lateral direction.

As means to overcome this drawback, there has been proposed a technique to form peak portions (portions in contact with the counter substrate) on the columnar spacers of the liquid crystal display device having a recessed shape by exposing portions corresponding to the peak portions using a photo mask shielding the exposure portions from light partially or having a transmissivity which is changed continuously or in a step-like manner and their development thereafter, so as to keep the gap between the substrates uniform by enlarging the contact diameters where the peak portions come into contact with the counter substrate. Here, with respect to this type of construction, a technique disclosed in the following patent literature 1 is cited as an example.

[Patent Literature 1]
Japanese Unexamined Patent Publication 2002-229040

SUMMARY OF THE INVENTION

However, a liquid crystal display device having such a constitution has a drawback in that the formation of the recessed portions on the peak portions of the columnar spacers in a recessed form is liable to be subject to the influence of a wraparound of light from an edge of the mask at the time of exposure, the flow direction of a developing solution and the like at the time of developing, and, hence, the controllability of the above-mentioned recessed shape is difficult.

Further, since the peak portions of the columnar spacers are formed in a recessed shape, the liquid crystal is not filled in the peak portions and cavities are formed, and, hence, the peak portions are observed with the naked eye as if air bubbles are generated in the peak portions, thus giving rise to a drawback that the display quality is degraded.

Further, the support column surfaces of the columnar spacers, particularly portions of the columnar spacers which come into contact with the counter substrate, are formed to have a smooth shape, so that a displacement of the substrates is generated due to warping or deflection of the opposing upper and lower substrates, thus giving rise to a drawback that a defective display is liable to be generated.

Accordingly, the present invention has been made to overcome the above-mentioned drawbacks, and it is an object of the present invention to provide a liquid crystal display device and a method of manufacture thereof which can result in a high-quality image display, wherein by enhancing the frictional force between columnar spacers and a counter substrate, and keeping the gap between the substrates uniform, the generation of a displacement between upper and lower substrates is prevented.

To achieve such an object, in a liquid crystal display device according to the present invention, support column surfaces of columnar spacers are made rough so as to increase the frictional force between the color filter substrate and the thin film transistor substrate, which substrates are arranged to face each other in an opposed manner, thus preventing a displacement between the color filter substrate and the thin film transistor substrate attributed to stress applied to the columnar spacers due to warping, deflection and the like of the color filter substrate and the thin film transistor substrate.

Further, according to a method of manufacture of a liquid crystal display device according to the present invention, photosensitive resin is applied to at least one of the inner surfaces of the color filter substrate and the thin film transistor substrate, and it is dried by heating; and, thereafter, exposure is applied to the photosensitive resin using a mask which has light transmitting portions at portions thereof corresponding to positions where the columnar spacers are expected to be formed so as to develop the photosensitive resin; a support column spacer pattern is formed by removing unexposed portions and is cured by baking to form support column spacers; and, thereafter, the surface roughening treatment is applied to support column surfaces of the support column spacers, thus forming the columnar spacers.

Here, it is needless to say that the present invention is not limited to the above-mentioned constitutions and the constitutions of the embodiments to be described later, and it is applicable, in the same manner, to an IPS type liquid crystal display device, a TN type liquid crystal display device, a simple matrix type liquid crystal display devices, other liquid crystal display device, or a panel type display device or the like on which a similar restriction is imposed with respect to the gap, and various modifications are conceivable without departing from the technical concept of the present invention embodied in the scope of claims.

BRIEF DESCRIPTION OF THE DRAWINGS

FIGS. 3A and 3B are enlarged cross-sectional views showing the constitution of a columnar spacer according to the present invention, wherein

DETAILED DESCRIPTION

Hereinafter, a mode for carrying out the present invention will be explained in detail in conjunction with the drawings.

Figure 1:
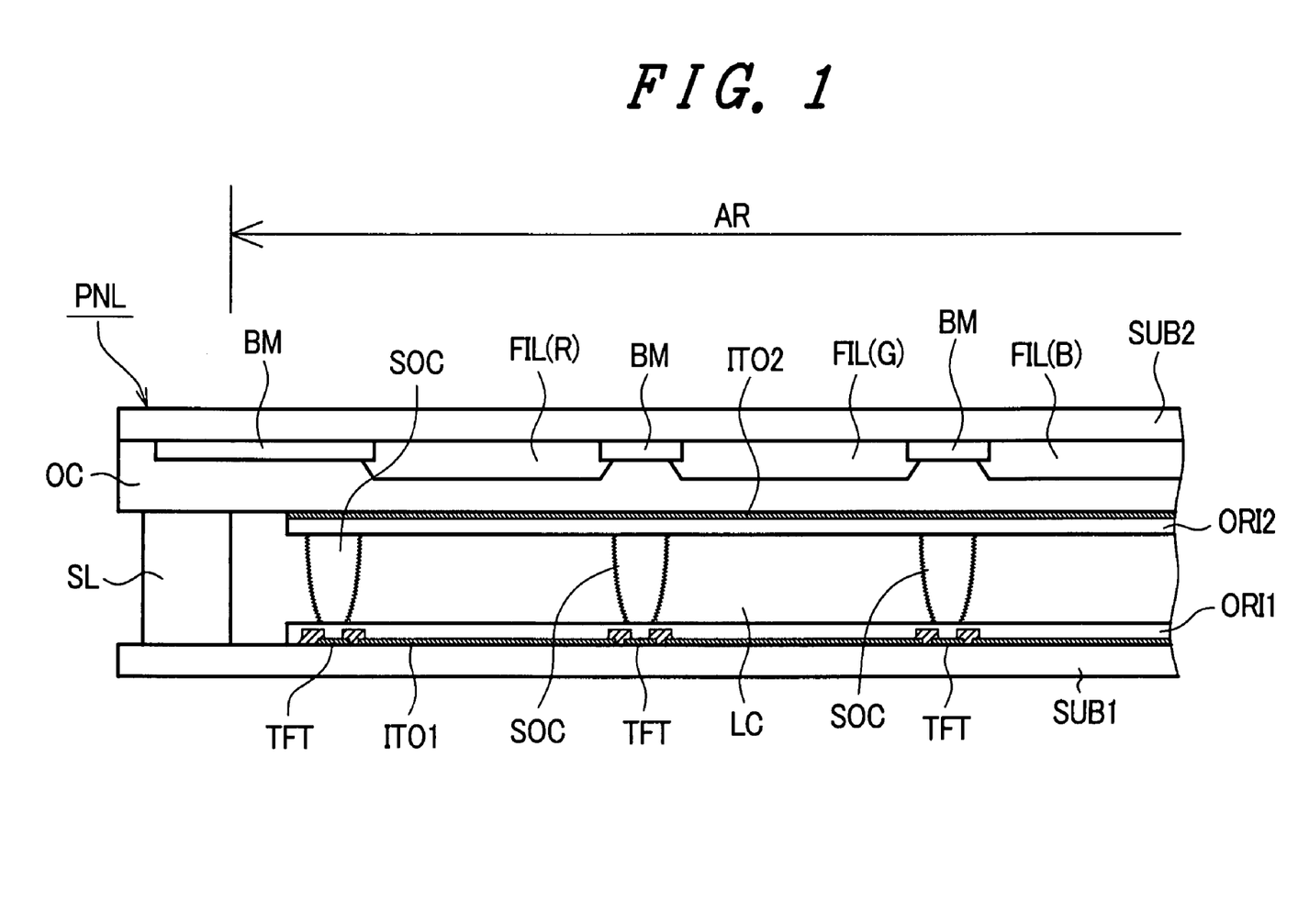
FIG. 1 is a cross-sectional view showing the constitution of a liquid crystal display device according to one embodiment of the present invention.

FIG. 1 is a cross-sectional view showing the constitution of the liquid crystal display device according to one embodiment of the present invention. In FIG. 1, a first substrate SUB1 constitutes a thin film transistor substrate and a second substrate SUB2 constitutes a color filter substrate. On an inner surface of the thin film transistor substrate SUB1, a large number of thin film transistors TFT and the like are arranged two-dimensionally corresponding to the number of pixels.

Each thin film transistor TFT includes, although not shown in the drawing, a gate electrode, a semiconductor layer formed of amorphous silicon or poly silicon, a source electrode and a drain electrode. Further, on the inner surface of the thin film transistor substrate SUB1, pixel electrodes ITO1 are formed of a transparent conductive film and are connected to the source electrodes of respective thin film transistors TFT. Further, to the thin film transistor substrate SUB1, a liquid crystal orientation film ORI1 is applied as a film by coating so as to cover the thin film transistors TFT and the pixel electrodes ITO1.

On an inner surface of the color filter substrate SUB2, color filters FIL of three colors (usually, red (R), green (G), blue (B)) are arranged in such a manner that the color filters FIL are divided by a black matrix BM formed of a resin material serving as a light shielding layer. The black matrix BM is formed by applying a photosensitive resin material, in which a light absorbing material is dispersed, to the inner surface of the color filter substrate SUB2 and forming openings in respective pixel regions by exposure using a mask and a photolithography process. Further, the color filters FIL are formed in these openings also by a photolithography method using a pigment dispersed resin material or the like.

The color filters FIL (R, G, B) and the black matrix BM which are formed in this manner usually have different film thicknesses, and, hence, surface irregularities are generated on the surface on which these films are formed. When the surface is uneven, the film shapes of a transparent common electrode and an orientation film, which are formed afterwards, and the height of columnar spacers are influenced. Therefore, a leveling layer (or a smoothing layer) OC made of a light transmitting resin material is formed over the color filters FIL (R, G, B) and the black matrix BM. Further, this leveling layer OC also has a function of protecting the color filters FIL from chemicals which are used in a subsequent etching process.

Then, on an outer surface of the leveling layer OC, a common electrode ITO2, which is constituted of a transparent conductive film, is formed as a counter electrode. In this example, above the three-color color filters FIL (R, G, B), the transparent common electrode ITO2 is formed. Further, above this common electrode ITO2, a second liquid crystal orientation film OR2 is formed by coating. This common electrode ITO2 is selectively formed on the leveling layer OC at a given position.

Further, on the inner surface of this color filter substrate SUB2, columnar spacers SOC are provided for holding a fixed gap between the color filter substrate SUB2 and the thin film transistor substrate SUB1. These columnar spacers SOC are formed in a region where the black matrix BM is formed. On the surfaces of these support columns, rough surfaces constituted of a large number of minute irregularities are formed.

The columnar spacers SOC are formed by patterning a photosensitive resin film using a photolithography method similar to the photolithography method which is used for forming the above-mentioned black matrix BM or the color filters FIL and, thereafter, by applying the oxygen plasma treatment to the surfaces of the columns. Alternatively, the columnar spacers SOC are formed by patterning an upper layer of the leveling layer OC and by applying oxygen plasma treatment to surfaces of the support columns. Although most of these columnar spacers SOC are formed on the upper surface of the leveling layer OC, depending on the size of the liquid crystal panel, the mechanical strength of the substrate and the size of the gap defined between the two substrates which are arranged to face each other, the columnar spacers SOC also may be formed on the transparent common electrode ITO2. Accordingly, in this constitutional example, the columnar spacers SOC are formed after the transparent common electrodes ITO2 are formed on the color filter substrates SUB2.

The columnar spacers SOC within the display region AR are positioned below the black matrix BM which divides respective colors of the color filters FIL. Accordingly, these columnar spacers SOC do not affect the light which transmits within the liquid crystal layer LC. Therefore, the columnar spacers SOC are provided at positions where a lowering of the contrast by the leaking of light or the like is not generated.

With respect to the thin film transistor substrate SUB1 and the color filter substrate SUB2 which are formed in such a manner, a sealing material is applied by printing to an outer peripheral portion of the inside of at least one substrate. Main surfaces of the substrates on which respective electrodes are formed are arranged to face each other with a given gap therebetween by way of the columnar spacers SOC, and they are bonded to each other and are cured to form a liquid crystal cell. Then, the liquid crystal is injected into the liquid crystal cell through a liquid crystal filing port (not shown in the drawing) formed in the liquid crystal cell to fill the gap, thus forming the liquid crystal layer LC, whereby the liquid crystal display panel PNL is completed.

According to the above-mentioned constitution, by making the entire surfaces of the support columns of the columnar spacers SOC rough, the frictional force between the thin film transistor substrate SUB1 and the color filter substrate SUB2 can be enhanced. Accordingly, the generation of displacement between the thin film transistor substrate SUB1 and the color filter substrate SUB2 due to a stress applied to the support column spacers SOC attributed to warping, deflection or the like of the thin film transistor substrate SUB1 and the color filter substrate SUB2, as well as the generation of displacement between the thin film transistor substrate SUB1 and the color filter substrate SUB2 due to a stress applied to the liquid crystal display panel PNL when the panel PNL is formed into a module, can be assuredly prevented, whereby the generation of a defective display can be completely eliminated.

Figure 2:
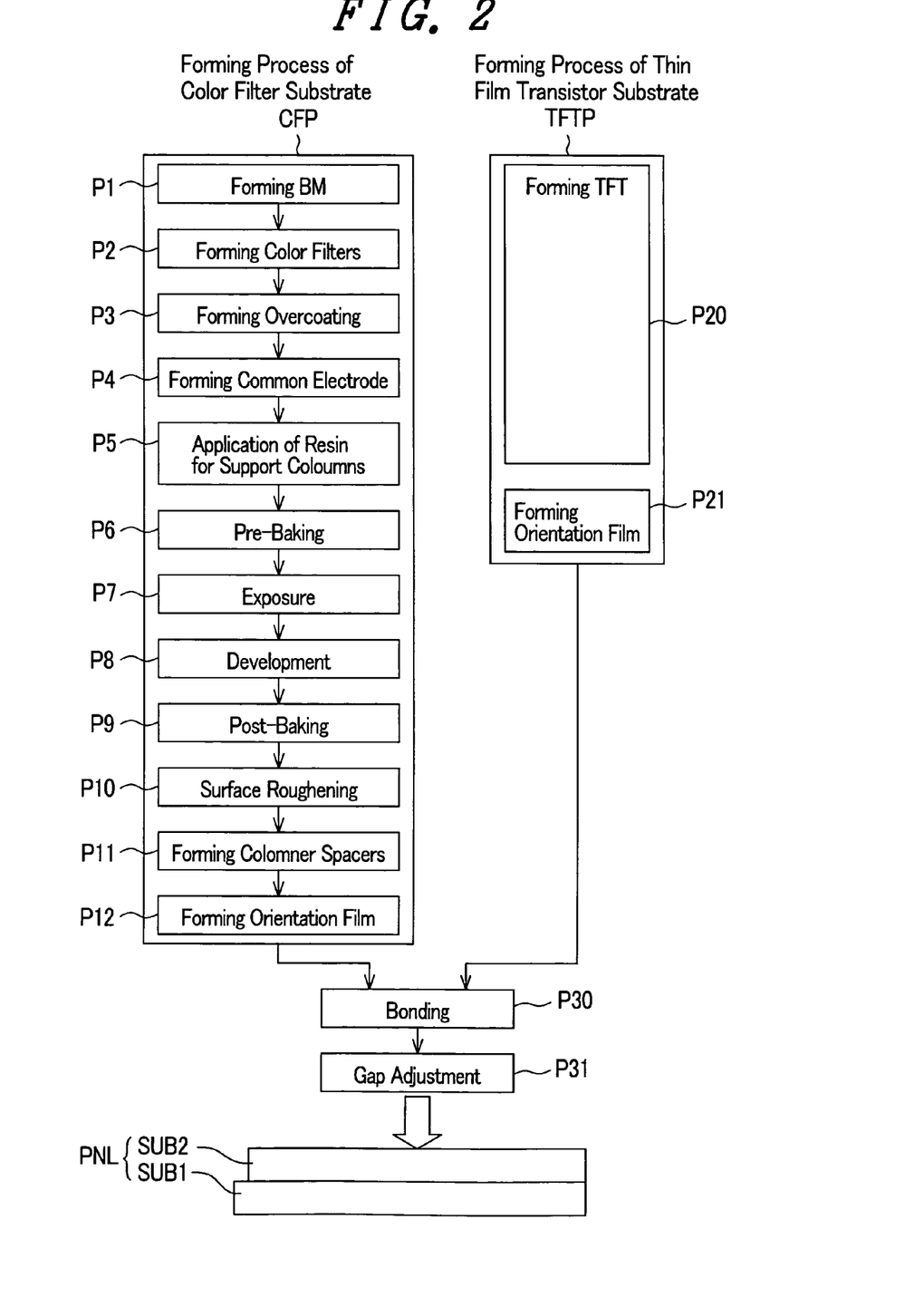
FIG. 2 is a flow chart schematically showing the steps of a method of manufacture of the liquid crystal display device according to the present invention.

FIG. 2 is a flow chart presenting a summary of the manufacturing steps according to one embodiment of the method of manufacture of the liquid crystal display device according to the present invention. In FIG. 2, in a process CFP of forming the above-mentioned color filter substrate SUB2, after the black matrix BM is formed on a glass substrate for color filters (P1), the color filters FIL of three colors (R, G, B) are formed by sequentially embedding the color filters FIL in the opening portions formed in the black matrix BM using resin materials containing pigments (P2). Next, on the black matrix BM and the color filters FIL, the leveling layer (the over coating) OC is formed (P3) to cover them. Thereafter, on the upper surface of the leveling layer OC, the light transmitting common electrode ITO1 is formed (P4).

Next, photosensitive resin for forming the support columns is applied to the upper surface of this transparent common electrode ITO2 by coating thereon using a spin coater method or a slit coater method, and thus a photosensitive resin film is formed (P5). Next, after a solvent in the photosensitive resin film is dried by performing pre-baking (P6), portions of the photosensitive resin corresponding to positions where the columnar spacers are formed are irradiated with light through a mask having light transmitting areas at the positions thereof corresponding to the portions where the columnar spacers SOC are formed so as to expose the portions (P7).

Next, by using an alkaline developing solution, unnecessary portions of the photosensitive resin film are removed (P8) to form the pattern of the support column spacers, which become the above-mentioned columnar spacers SOC, and the columnar spacers are cured by post-baking (P9). The pattern shape of the support column spacers at this stage is the support column spacer SOC', which has a substantially trapezoidal shape, as shown in cross-sectional view in FIG. 3A, and the surface of the columnar spacer SOC' is smooth. This is a phenomenon generated by post-baking during the columnar forming process attributed to the fact that the photosensitive resin material which constitutes a main component has a reflow property.

Thereafter, oxygen plasma treatment is applied to the columnar spacers SOC' having a trapezoidal shape so as to make the surfaces of the columnar spacers SOC' rough (P10). The pattern shape after the processing forms the columnar spacer SOC, which has a large number of minute irregularities on the columnar surface thereof, as shown in cross-sectional view in FIG. 3B (P11). Thereafter, on an uppermost surface including the columnar spacers SOC, an orientation film ORI2 is applied by coating and is subjected to an orientation treatment by an appropriate method, such as rubbing, thus obtaining the color filter substrate SUB2 (P12).

On the other hand, in the process TFTP for forming the above-mentioned thin film transistor substrate SUB1, by forming given lines, electrodes and various films and by patterning on the glass substrate for thin film transistors, the thin film transistors TFT are formed (P20). Thereafter, the orientation film ORI1 is formed and subjected to orientation treatment in the same manner, thus obtaining thin film transistor substrate SUB1 (P21).

The outer peripheral portions of the inner sides of the color filter substrate SUB2 and the thin film transistor substrate SUB1, which are manufactured in such a manner, are bonded to each other using a sealing material SL (P30). The sealing material SL is temporarily cured by heating or by irradiating ultraviolet rays thereon, and, thereafter, gap adjustment is performed by the application of pressure and heating treatment (p31). Main curing is applied to the sealing material SL to form a liquid crystal cell, and liquid crystal is injected into the liquid crystal cell, thus completing the liquid crystal display device PNL, as shown in FIG. 1. No abnormality is specifically observed when a display screen is observed in a state in which stress is applied to the liquid crystal display device PNL from the outside. Further, no abnormality is specifically observed in an acceleration test in which the liquid crystal display device PNL thus formed is operated at a high temperature.

Figure 3A:
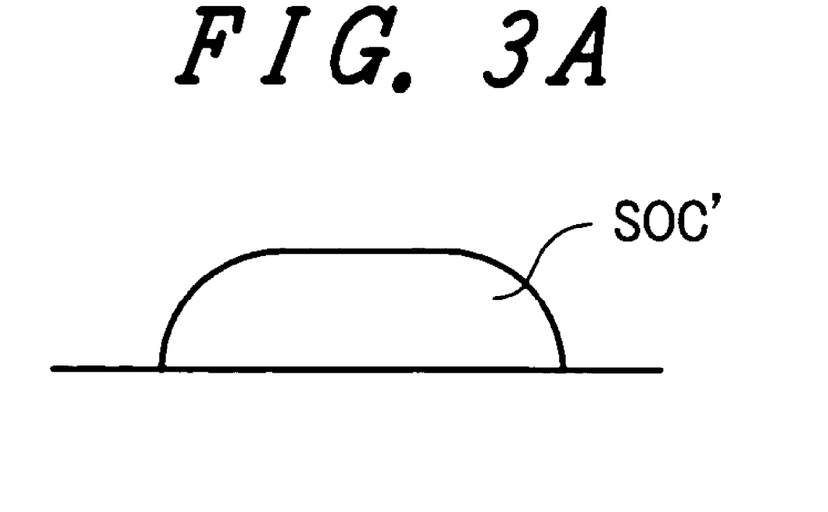
FIG. 3A shows a cross-sectional view of the columnar spacer before surface roughening is applied thereto.
Figure 3B:
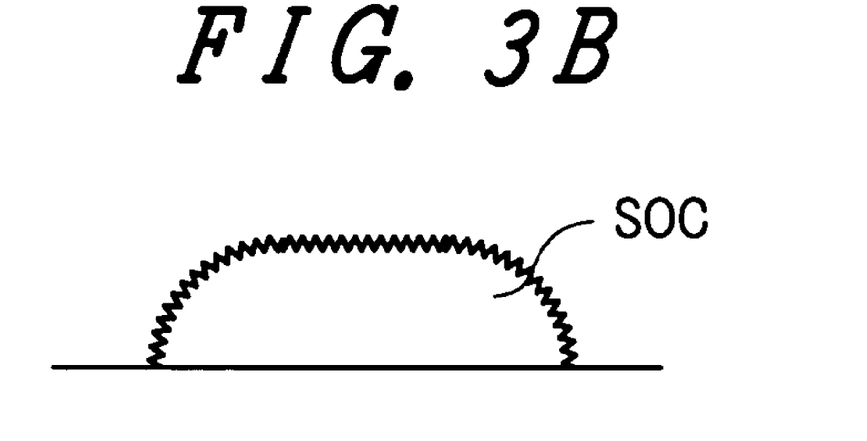
FIG. 3B shows a cross-sectional view of the columnar spacer after surface roughening is applied thereto.

In another embodiment of the method of manufacture of the liquid crystal display device according to the present invention, the same processes as described in conjunction with the above embodiment are used up to the formation of the columnar spacers SOC' having smooth surfaces (p9) as shown in FIG. 3A, and, as the treatment method for making the surfaces of the columnar spacers rough, a surface treatment is performed by soaking the columnar spacers in an alkaline solution, such as sodium hydroxide, for example. With respect to the pattern shape after the treatment, a large number of minute irregularities are formed on the surfaces of the support columns in exactly the same manner as the above-mentioned embodiment. The color filter substrate SUB2 thus manufactured is bonded to the thin film transistor substrate SUB1 by a sealing material SL and is cured, thus forming a liquid crystal cell. Liquid crystal is injected into the liquid crystal cell, thus obtaining the liquid crystal display device PNL shown in FIG. 1. No abnormality is observed when a display screen is observed in a state in which stress is applied to the liquid crystal display device PNL from the outside.

In still another embodiment of the method of manufacture of the liquid crystal display device according to the present invention, the same processes as described in conjunction with the above embodiments are used up to the formation of the columnar spacers SOC' having smooth surfaces (p9) as shown in FIG. 3A, and, as the treatment method for making the surfaces of the columnar spacers SOC rough, a comparatively large amount of ultraviolet rays (Deep-UV) is applied to the surfaces of the columnar spacers. With respect to the pattern shape after the treatment, absolutely in the same manner as the treatment of the above-mentioned two embodiments, a large number of minute irregularities with a depth of approximately 250 to 300 μm are formed on the columnar surface. The color filter substrate SUB2, which is manufactured in this manner, is bonded to the thin film transistor substrate SUB1 by a sealing material SL and is cured to form a liquid crystal cell. Then, the liquid crystal is injected into the liquid crystal cell, thus obtaining the liquid crystal display device PNL shown in FIG. 1. No specific abnormality is recognized when a display screen is observed in a state in which stress is applied to the liquid crystal display device PNL from the outside.

Next, a comparative example of the method of manufacture of the liquid crystal display device according to the present invention will be explained in conjunction with FIG. 2. First of all, in accordance with the flow of steps for forming the columnar spacers SOC on the color filter substrate SUB2 side, photosensitive resin for forming support columns is applied to the whole surface of the color filter substrate SUB2 using a spin coater method, a slit coater method or the like (P5). Next, after the solvent is dried by pre-baking (P6), light is irradiated to the portions of the photosensitive resin where the columnar spacers are to be formed, using a mask, thus exposing the portions (P7). Next, by using an alkaline developing solution, unnecessary portions of the photosensitive resin film are removed to form the columnar spacers SOC' (P8), and the columnar spacers SOC' are cured by post-baking (P9). The pattern shape of the columnar spacers SOC' at this stage is a trapezoidal shape, as shown in FIG. 3A, and the surface thereof is smooth.

The color filter substrate SUB2, which is manufactured in this manner, is bonded to the thin film transistor substrate SUB1 using a sealing material SL and is cured to form a liquid crystal cell, and the liquid crystal is injected into the liquid crystal cell, thus obtaining the liquid crystal display device PNL shown in FIG. 1. A defective display having a moiré pattern is observed when the display screen is observed in a state in which stress is applied to the liquid crystal display device PNL from the outside.

With respect to the columnar spacers SOC, which are formed in accordance with the above-mentioned method, by making the surfaces of the support columns of the columnar spacer SOC' having a trapezoidal shape with a smooth surface that has been roughened by oxygen plasma treatment, alkali solvent immersing treatment or an ultraviolet ray irradiating method, one layer of the surface of the support column is removed, and, hence, contaminants which adhere to or are absorbed into the surfaces of the support columns during manufacture are assuredly removed, and the surfaces of the support columns are purified so that the generation of contamination of the liquid crystal is completely eliminated.

Here, in the above-mentioned respective embodiments, a case in which the columnar spacers are formed on the color filter substrate side has been explained. However, the present invention is not limited to this, and advantageous effects which are substantially similar to the above-mentioned advantageous effects can be obtained even when the columnar spacers are formed on the thin film transistor substrate side. In this case, the thin film transistor TFT, the pixel electrodes, the lines and the like are formed on the inner side of the thin film transistor substrate, and, hence, irregularities are generated on the inner surfaces of the thin film transistor substrate attributed to the film thicknesses, so that it is necessary to form a leveling layer. Further, it is needless to say that even when the columnar spacers are formed on the inner surfaces of both the color filter substrate and the thin film transistor substrate, advantageous effects which are exactly the same as the above-mentioned advantageous effect can be obtained.

Figure 4:
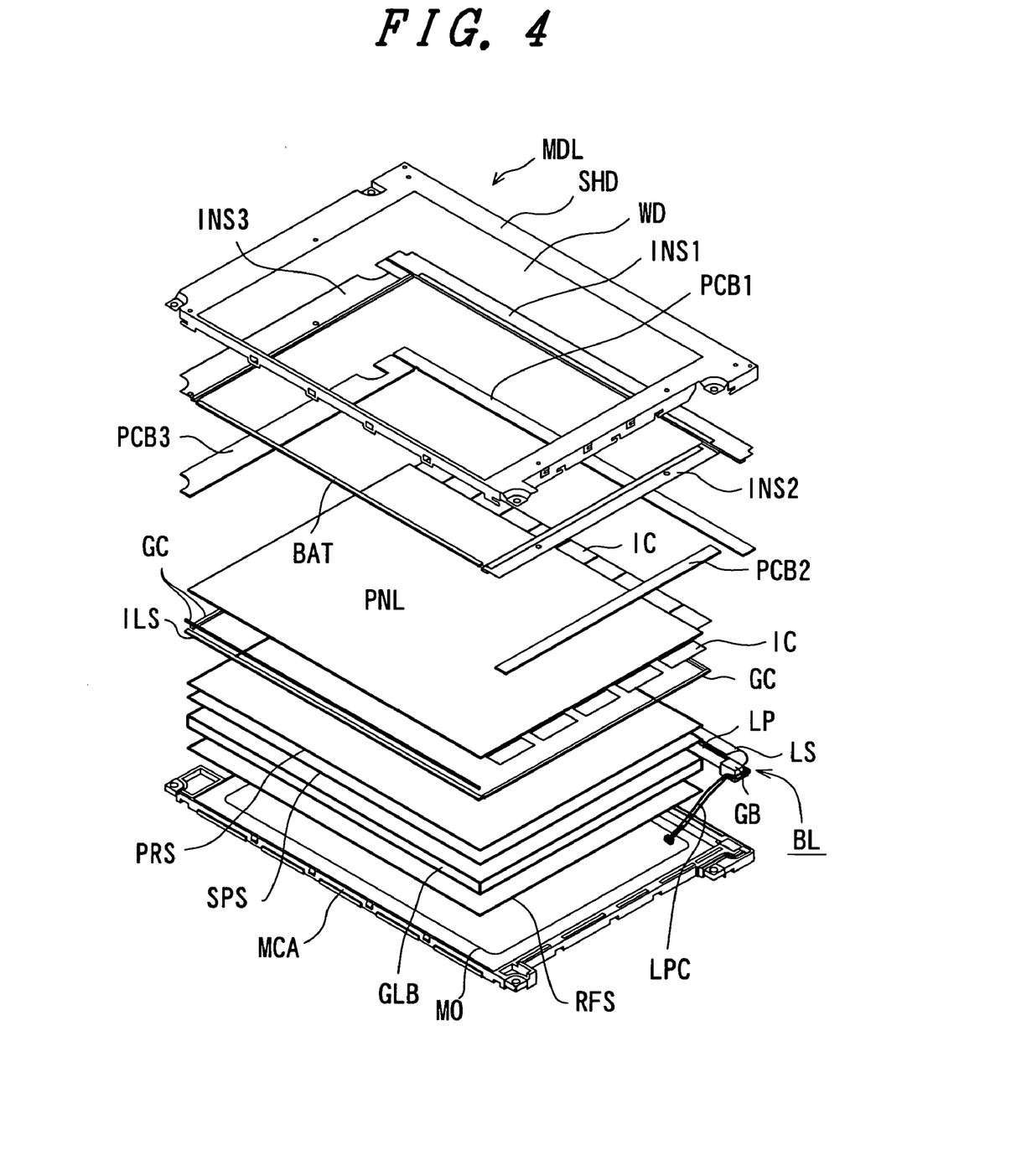
FIG. 4 is a developed perspective view illustrating the overall constitution of a liquid crystal display module which uses the liquid crystal display device according to the present invention.

FIG. 4 is a developed perspective view showing an example of the overall constitution of a liquid crystal display module which uses the liquid crystal display device according to the present invention. The liquid crystal display module MDL is constituted by integrally forming drive means which are necessary for producing an image display, a backlight and other members on the liquid crystal display device the above-mentioned embodiments. In FIG. 4, reference symbol SHD indicates a shield case (also referred to as a metal frame) which is made of a metal plate, reference symbol WD indicates a display window, reference symbols INS1 to INS3 indicate insulation sheets, and reference symbols PCB1 to PCB3 indicate printed circuit boards which constitute drive means.

In general, the drain-side printed circuit board PCB1, which supplies video signals, and the gate-side printed circuit board PCB2, which supplies selection signals for the thin film transistors, are formed of a so-called flexible printed circuit board, while the interface printed circuit board PCB3 is formed of a hard printed circuit board.

Further, IC indicates a position where an integrated circuit chip which constitutes a drive circuit is mounted. Further, PNL indicates the liquid crystal display device, GC indicates a rubber cushion, ILS indicates a light shielding spacer, PRS indicates a prism sheet, SPS indicates a diffusion sheet, GLB indicates a light guide plate, RFS indicates a reflection sheet, MCA indicates a lower-side case (a mold frame) which is formed by integral molding, MO indicates an opening formed in a lower-side case MCA, LP indicates a fluorescent tube, LPC indicates a lamp cable, GB indicates a rubber bushing for supporting the fluorescent tube LP, BAT indicates a double-sided adhesive tape, and BL indicates a backlight formed of the fluorescent tube LP and the light guide plate GLB. The liquid crystal display module MDL is assembled by stacking the diffusion sheet member in accordance with the arrangement shown in the drawing.

The liquid crystal display module MDL includes two kinds of housing and holding members consisting of the lower-side case MCA and the shield case SHD, and it is integrally formed by joining the metal-made shield case SHD, which houses and fixes the insulation sheets INS1 to INS3, the printed circuit board PCB1 to PCB3 and the liquid crystal display device PNL therein, and the lower-side case, which houses the backlight BL formed of the fluorescent lamp LP, the light guide plate GLB, the prism sheet PRS and the like.

On the interface printed circuit board PCB3, an integrated circuit chip, which receives video signals from an external host and also receives control signals, such as timing signals, a timing converter TCON, which processes various kinds of timing signals supplied from the external host to generate clock signals for display and the like, are mounted. Here, it is needless to say that the constitution shown in FIG. 4 merely constitutes one example and various constitutions are available corresponding to the apparatus to which the present invention is applicable.

Figure 5:
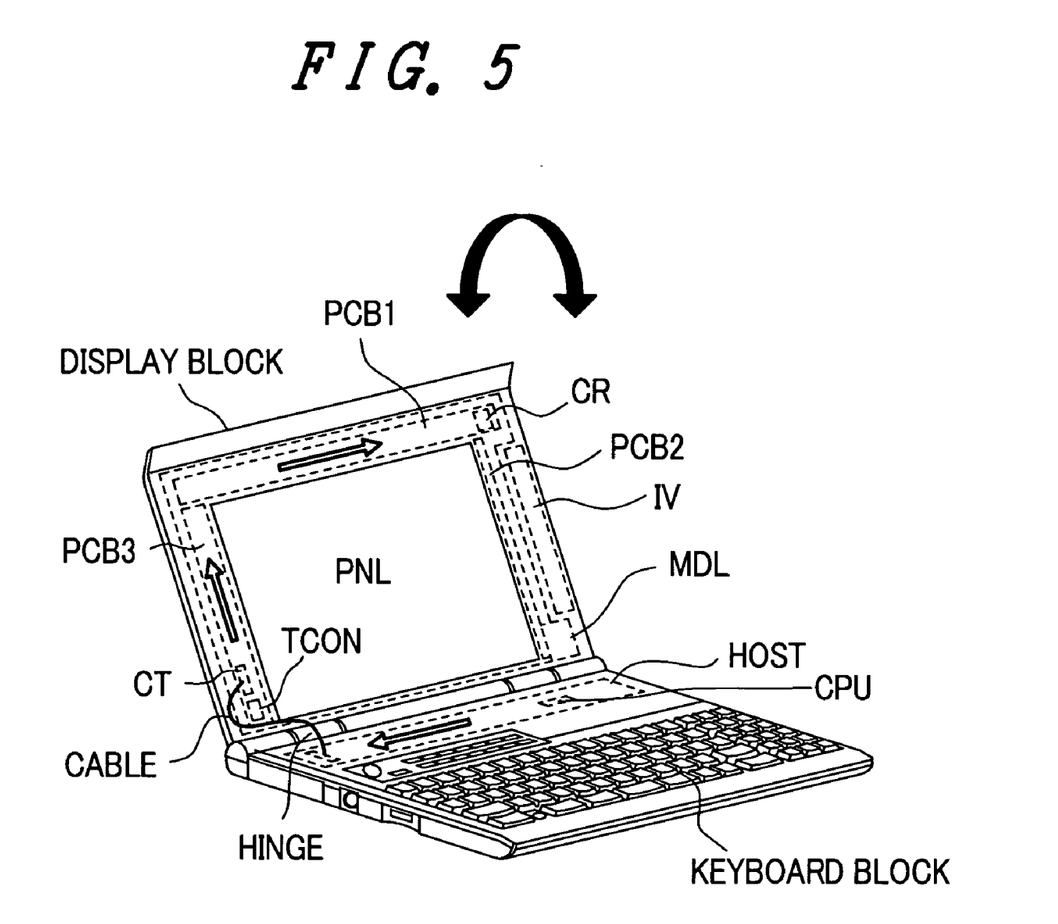
FIG. 5 is a perspective view of a notebook type computer representing one example of electronic equipment in which the liquid crystal display device according to the present invention is mounted.

FIG. 5 is a perspective view of a notebook type computer that represents an example of electronic equipment in which the liquid crystal display device of the present invention is mounted. In FIG. 5, the notebook type computer (a portable personal computer) is constituted of a keyboard part (a main body part) and a display part, which is connected to the keyboard part by hinges.

The keyboard part houses parts having display signal generating functions, such as a keyboard, a host (a host computer), a central processing unit CPU and the like therein. The display part includes the liquid crystal display device PNL, and the printed circuit boards PCB1, PCB2, PCB3 and an inverter power source circuit board IV, which becomes a backlight power source on a periphery of the display part, are mounted thereon. Then, the liquid crystal display module MDL, as explained in conjunction with FIG. 4, is mounted such that the above-mentioned liquid crystal display device PNL, the printed circuit board PCB1 to PCB3, the inverted power source board and the backlight are integrally formed. A plurality of capacitors/resistors CR are arranged at an end of one of the printed circuit boards PCB1, and one of the ends of a cable is connected to a connector CT provided at the other one of the printed circuit boards PCB3.

It is needless to say that the liquid crystal display device according to the present invention is not limited to the notebook type personal computer described in conjunction with FIG. 5, and the liquid crystal display device according to the present invention is applicable to a large-sized monitor, such as a display device of a desk top type personal computer, and a small-sized monitor, such as a personal digital assistant, a mobile phone or the like.

As has been explained heretofore, according to the present invention, it is possible to surely prevent the generation of a displacement between the thin film transistor substrate and the color filter substrate due to stress applied to the support column spacers and the liquid crystal display panel attributed to warping, as well as to present deflection of the thin film transistor substrate and the color filter substrate, and it can largely enhance the mechanical strength. Hence, the mechanical strength can be largely enhanced, so that the generation of a defective display caused by displacement between the thin film transistor substrate and the color filter substrate can be completely eliminated, whereby it is possible to obtain an extremely excellent advantageous effect in that the display quality is largely enhanced and a high-quality image display can be obtained.

Further, according to the method of manufacture of the liquid crystal display device of the present invention, although the step for making the surfaces of the columnar spacers rough is added, the generation of warping of the thin film transistor substrate and the color filter substrate and displacement between these substrates can be eliminated. Hence, the generation of a defective display attributed to warping and displacement can be completely eliminated, whereby it is possible to obtain an extremely excellent advantageous effect in that the liquid crystal display device which is capable of exhibiting a largely enhanced yield rate and display quality and of producing a high-quality image display with favorable productivity.

What is claimed is:

1. A liquid crystal display device comprising:
    a color filter substrate which includes color filter layers of a plurality of colors which are defined by a light shielding layer on a first substrate, a resin leveling layer which is arranged above the light shielding layer and the color filter layers to cover the light shielding layer and the color filter layers, and a light transmitting common electrode which is formed over the resin leveling layer;
    a thin film transistor substrate which includes a large number of thin film transistors which are arranged two-dimensionally and pixel electrodes which generate electric fields between the pixel electrodes and the light transmitting common electrode, the thin film transistor substrate being arranged to face the color filter substrate in an opposed manner with a given gap therebetween;

columnar spacers which are arranged in a distributed manner between opposing faces of the color filter substrate and the thin film transistor substrate to define the given gap;

a liquid crystal layer which is sealed in a display region formed between opposing faces of the color filter substrate and the thin film transistor substrate; and a sealing material applied region which surrounds a periphery of the display region and to which a sealing material which seals the liquid crystal layer filled in the gap is applied by coating;

wherein the columnar spacer has a roughened surface which is formed of minute irregularities on an outer surface of a support column thereof.

2. A liquid crystal display device according to claim 1, wherein the columnar spacers are made of photosensitive resin.

3. A liquid crystal display device according to claim 1 or claim 2, wherein the columnar spacers are interposed between the opposing faces of the light shielding layer and the thin film transistors.

4. A liquid crystal display device according to claim 1, wherein the roughened surface of the columnar spacer which is formed of the minute irregularities on the outer surface of the support column of the columnar spacer is formed by one of oxygen plasma treatment, immersing in an alkaline solution, and irradiation of ultraviolet rays on the outer surface of the support column of the columnar spacer.

5. A liquid crystal display device according to claim 1, wherein the roughened surface of the columnar spacer which is formed of the minute irregularities on the outer surface of the support column of the columnar spacer includes a circumferential portion which is directly exposed to the liquid crystal layer which is sealed in the display region formed between the opposing faces of the color filter substrate and the thin film substrate.

6. A liquid crystal display device according to claim 1, wherein the roughened surface of the columnar spacer enables an increase of frictional force between the color filter substrate and the thin film transistor substrate.

7. A liquid crystal display device according to claim 1, wherein the roughened surface of the columnar spacer enables preventing of displacement between the color filter substrate and the thin film substrate attributed to stress applied to the columnar spacer due to at least one of warping and deflection of the color filter substrate and the thin film substrate.

8. A liquid crystal display device according to claim 1, wherein the roughened surface of the columnar spacer having the minute irregularities include a large number of the minute irregularities with a depth of approximately 250 to 300 μm on the outer surface of the support column thereof.

9. A liquid crystal display device according to claim 1, further comprising an orientation film disposed on at least one of the color filter substrate and the thin film substrate, the columnar spacer having one end in contact with the orientation film on the at least one of the color filter substrate and the thin film substrate and extending toward an other of the color filter substrate and the thin film substrate, the columnar spacer having a circumferential portion which is out of contact with the orientation film and directly exposed to the liquid crystal layer.

10. A liquid crystal display device according to claim 4, wherein the roughened surface formed of the minute irregularities on the outer surface of the support column thereof is formed by oxygen plasma treatment on the outer surface of the support column of the columnar spacer.

11. A liquid crystal display device according to claim 4, wherein the roughened surface of the columnar spacer formed of the minute irregularities on the outer surface of the support column of the columnar spacer is formed by immersing the columnar spacer in an alkaline solution so as to form the minute irregularities on the outer surface of the support column of the columnar spacer.

12. A liquid crystal display device according to claim 4, wherein the roughened surface of the columnar spacer formed of the minute irregularities on the outer surface of the support column thereof is formed by irradiation of ultraviolet rays on the outer surface of the support column of the columnar spacer so as to form the minute irregularities on the outer surface of the support column of the columnar spacer.

13. A liquid crystal display device according to claim 4, wherein the roughened surface of the columnar spacer which is formed of the minute irregularities on the outer surface of the support column of the columnar spacer includes a circumferential portion which is directly exposed to the liquid crystal layer which is sealed in the display region formed between the opposing faces of the color filter substrate and the thin film substrate.

14. A liquid crystal display device according to claim 4, wherein the roughened surface of the columnar spacer enables an increase of frictional force between the color filter substrate and the thin film transistor substrate.

15. A liquid crystal display device according to claim 4, wherein the roughened surface of the columnar spacer enables preventing of displacement between the color filter substrate and the thin film substrate attributed to stress applied to the columnar spacer due to at least one of warping and deflection of the color filter substrate and the thin film substrate.

16. A liquid crystal display device according to claim 4, wherein the roughened surface of the columnar spacer having the minute irregularities include a large number of the minute irregularities with a depth of approximately 250 to 300 μm on the outer surface of the support column thereof.

17. A liquid crystal display device according to claim 4, further comprising an orientation film disposed on at least one of the color filter substrate and the thin film substrate, the columnar spacer having one end in contact with the orientation film on the at least one of the color filter substrate and the thin film substrate and extending toward an other of the color filter substrate and the thin film substrate, the columnar spacer having a circumferential portion which is out of contact with the orientation film and directly exposed to the liquid crystal layer.

18. A liquid crystal display device according to claim 4, wherein the columnar spacers are made of photosensitive resin.

19. A liquid crystal display device according to claim 4, wherein the columnar spacers are interposed between the opposing faces of the light shielding layer and the thin film transistors.

* * * * *